United States Patent [19]

Kotake et al.

[11] Patent Number: 4,936,157
[45] Date of Patent: Jun. 26, 1990

[54] RACK AND PINION TYPE STEERING APPARATUS

[75] Inventors: Yoshima Kotake; Keiichi Sakamoto; Hiroshi Higashiyama, all of Osaka, Japan

[73] Assignee: Koyo Seiko Co., Ltd., Osaka, Japan

[21] Appl. No.: 340,608

[22] Filed: Apr. 19, 1989

[30] Foreign Application Priority Data

Apr. 22, 1988 [JP] Japan .............................. 63-54840[U]

[51] Int. Cl.⁵ .............................................. B62D 3/12
[52] U.S. Cl. ......................................... 74/422; 74/498; 384/9; 384/29
[58] Field of Search ....................... 74/422, 89.17, 498; 180/148; 384/29, 9

[56] References Cited

U.S. PATENT DOCUMENTS

| | | | |
|---|---|---|---|
| 4,593,578 | 6/1986 | Kobayashi et al. | 74/498 |
| 4,683,769 | 8/1987 | Mochizuki | 74/498 |
| 4,785,685 | 11/1988 | Kobayashi et al. | 74/498 |
| 4,800,770 | 1/1989 | Kobayashi et al. | 74/498 |

FOREIGN PATENT DOCUMENTS

| | | | |
|---|---|---|---|
| 2001478 | 8/1970 | Fed. Rep. of Germany | 74/498 |
| 53-47222 | 9/1976 | Japan . | |
| 56-18270 | 2/1981 | Japan . | |
| 57-103267 | 12/1982 | Japan . | |
| 58-19873 | 2/1983 | Japan . | |
| 58-182869 | 12/1983 | Japan . | |
| 61-25275 | 2/1986 | Japan . | |
| 1248982 | 10/1971 | United Kingdom | 74/498 |

Primary Examiner—Allan D. Herrmann
Attorney, Agent, or Firm—Townsend and Townsend

[57] ABSTRACT

A rack and pinion type steering apparatus is provided with a rack guide made of synthetic resin. In the outer periphery of the rack guide, peripheral ribs are formed in the direction of its circumference and axial ribs are formed in its longitudinal direction, respectively. The space formed between those ribs and the inner periphery of a guide bore of the rack guide is set to be generally about the same as the space between a conventional rack guide made of sintered alloy and the inner periphery of the guide bore. As a result, at room temperature, each rib enables the same press performance as the conventional rack guide and the suitable reacting force at steering will be kept. Also at high temperature atmosphere, when each rib thermally expands and abuts the guide bore, the outer periphery excluding the portions of the ribs is thermally expanded, thus, thermal creep is prevented and stable engagement of the rack and pinion of the steering apparatus can be maintained at all times.

8 Claims, 2 Drawing Sheets

RACK AND PINION TYPE STEERING APPARATUS

BACKGROUND OF THE INVENTION

1. Field of the Invention

The present invention relates to a rack and pinion type steering apparatus and, more particularly, to improvement of a rack guide thereof.

2. Description of the Prior Art

A rack and pinion type steering mechanism has been widely used for a steering apparatus of an automobile. In such steering mechanism, a rack guide (a support yoke) is disposed on the back side of the position engaging with a pinion shaft at the rack shaft so that the rack shaft is securely engaged with the pinion shaft. The rack guide is fitted into a guide bore provided at a rack housing in the perpendicular direction to the rack shaft and is supported so that the rack shaft is properly pressed against the pinion shaft. At this time, in order to apply the proper pressure against the rack shaft, there is provided the minimum space between the rack guide and the inner periphery of the guide bore.

In the steering apparatus as described above, the rack guide made of sintered alloy has been used. In such a steering gear the space formed between the rack guide and the guide bore produces big hammering noise. To avoid this disadvantage, the rack guide made of synthetic resin has generally come to be used and many different techniques have been proposed. For example in Japanese Utility Model Application Laid-Open No. 57-103267 (1982), a rack guide is disposed with plural streaks of annular elastic ribs in the outer periphery thereof. In this case, the annular elastic ribs are pressed and fitted into the guide bore so as to abut the inner periphery of the guide bore, as a result, the rack guide is unlikely to smoothly move in its axial direction. To complement this disadvantage, it is necessary to provide higher press load of a spring thereof. It also has a disadvantage that the elastic ribs are easily deformed when they are loaded from the pinion shaft.

In Japanese patent application Laid-Open No. 59-216764 (1984), a rack guide is formed of double cylinders and its outer cylinder, ellipse in shape, is pressed and fitted into a guide bore in the rectangular direction to the direction of reciprocation of the rack shaft. In this case the rack guide is also unlikely to smoothly move in its axial direction. Since the outer cylinder is connected to the inner cylinder through a rib which is disposed in the shorter radius side thereof and there is not provided a rib in the longer radius side, that is, in the direction of the force being exerted most by load of the pinion shaft, there is a problem that it lacks in rigidity.

As described above, different problems exist in known apparatus of the examples. To solve those problems, there has been proposed that a rack guide made of synthetic resin of the same shape and size as that made of sintered alloy be fitted into the inner periphery of a guide bore with the minimum space between them as in the same way as the conventional. When the rack guide made of synthetic resin is utilized, since the rate of thermal expansion is higher than that of the rack guide made of sintered alloy at high temperature atmosphere, the rack guide is so tightly fitted into the guide bore that the required pressure to maintain proper engagement of gears of the pinion shaft with the rack shaft is not obtained. Thus making disadvantages that the steering wheel rotates with less reacting force or is worn out and thermal creep is produced in the rack guide. In order to avoid such inconvenience, when wider space is provided in advance to cope with thermal expansion, with actuation of the rack shaft and pinion shaft at room temperature, the rack guide is moved within the guide bore in the direction of its radius, that is, in the perpendicular direction to the pressing direction of the rack guide, as a result, the pressing direction becomes unstable and the reacting force at steering is reduced.

SUMMARY OF THE INVENTION

The foregoing disadvantages of the prior art are overcome in accordance with the present invention. It is a first object of the invention to provide a rack and pinion type steering apparatus in which ribs are disposed in the direction of circumference thereof and a plurality of ribs are arranged in the axial direction in the outer periphery of a rack guide, thereby having no influence of temperature change and maintaining proper engagement of the rack shaft with pinion shaft.

To attain the object, a rack and pinion type steering apparatus of the present invention is provided with a rack guide, which elastically contacts with the rack shaft so as to press the rack shaft against the pinion shaft and which is loosely fitted into a bore formed in a housing in the rectangular direction to the rack itself. The rack guide made of synthetic resin is provided in its outer periphery with a plurality of ribs separated from each other by equal spaces in the direction of circumference thereof with the direction of elastic contact of the rack guide with the rack shaft being the longitudinal one, and is provided with ribs formed annularly in the direction of circumference between each rib.

Radial movement of the rack guide which is loosely fitted into the bore is controlled by the ribs formed annularly in the direction of its circumference. The direction of elastic contact with the rack shaft is maintained to be straight by a plurality of ribs formed equally spaced in the direction of the circumference with the direction of elastic contact of the rack guide with the rack shaft being the longitudinal one. Since most of thermal expansion of the rack guide at high temperature atmosphere is exerted to the outer periphery excluding both the ribs of the rack guide, only the rib portions abut the inner periphery of the guide bore.

The above and further objects and features of the invention will be more fully apparent from the following detailed description with accompanying drawings.

DESCRIPTION OF THE PREFERRED EMBODIMENTS

Figure 1:
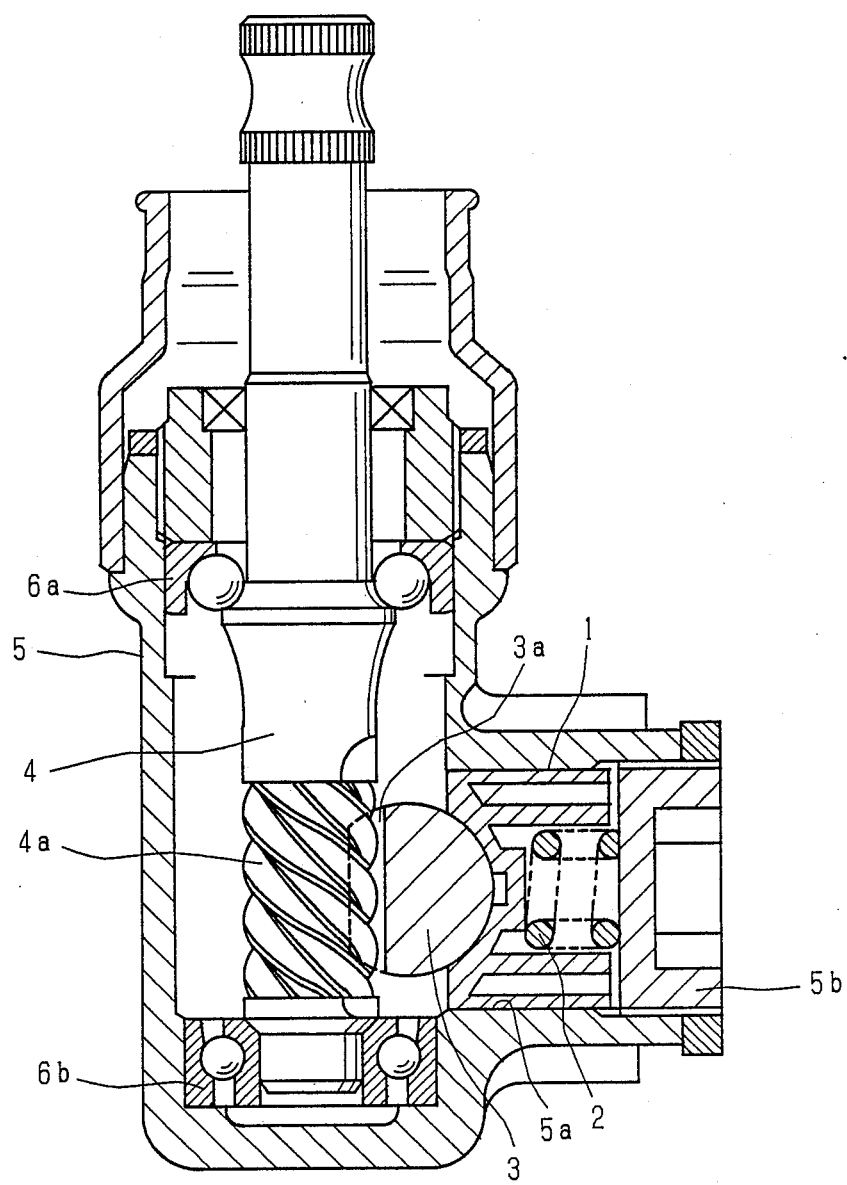
FIG. 1 is a fragmentary longitudinal sectional view of the steering apparatus in accordance with the present invention.

The present invention will not be described with reference to the drawings. FIG. 1 is a longitudinal sectional view showing a fragmentary portion of a rack and pinion type steering apparatus in accordance with the present invention (hereinafter referred to as the apparatus of the invention). In a housing 5, there is disposed with a pinion shaft 4 which is connected and associated with a steering wheel (not shown), both sides of a pinion gear 4a thereof being supported by ball bearings 6a and 6b. The pinion gear 4a of the pinion shaft 4 is engaged with a rack gear 3a being disposed in the rack shaft 3, whose longitudinal direction is positioned on the right and the left sides of a vehicle (not shown) and on both ends of which are arranged a ball joint, a link material and the like (all not shown) respectively so that the rack shaft can be connected to the right and left wheels (not shown). In conformity with pivotal movement of the steering wheel, the engagement position of the rack shaft 3 and pinion shaft 4 is changed and the rack shaft 3 moves longitudinally, thereby enabling steering the right and the left wheels.

Figure 2:
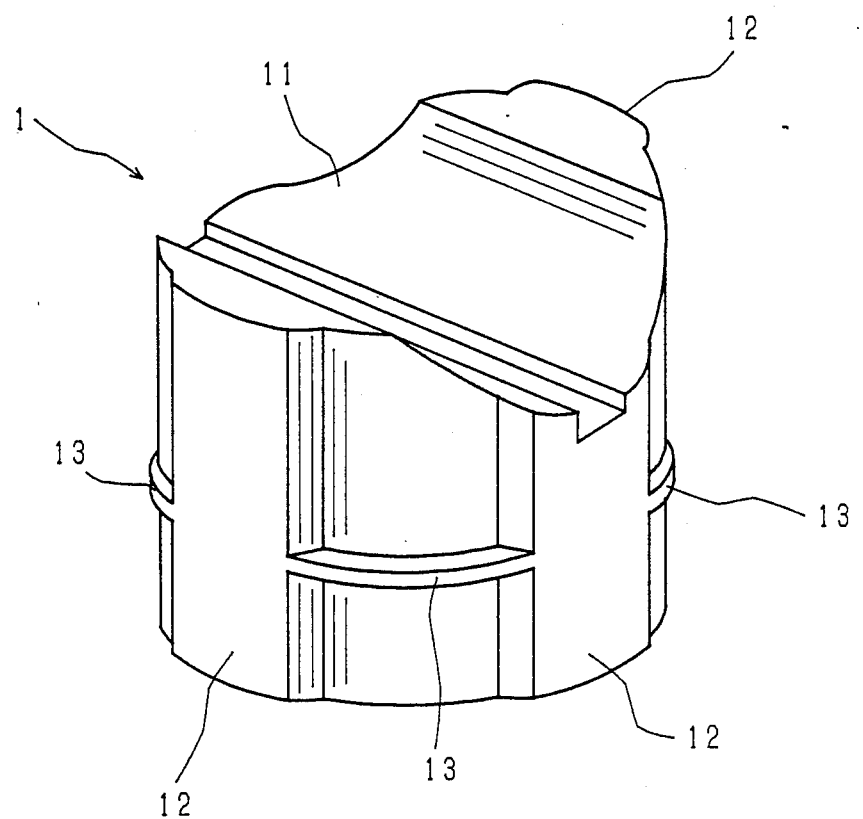
FIG. 2 is a perspective view taken from the outward appearance of the rack guide.

On the back side of engaging position of the rack shaft 3 with pinion shaft 4 in the housing 5, there is provided a guide bore 5a in the perpendicular direction to the rack shaft 3. The rack guide 1 made of synthetic resin in a form as shown in the perspective view taken from outward appearance of FIG. 2, is fitted into the guide bore 5a. The rack guide 1 includes at the end side of the rack shaft 3 thereof a press surface 11 which has a form of a curved surface and is engaged with the periphery of the rack 3. Through biasing force of a spring 2 fitted in between a sealing material 5b engaged with the extreme portion of the housing at the housing bore 5a and the inner portion of the rack guide 1, the rack shaft 3 is abutted the press surface 11 and is pressed against the pinion shaft 4 side, thereby maintaining such engagement to be stable.

On the outer periphery of the rack guide 1, there are formed four ribs 12 being separated from each other by equal spaces in the quartered positions of circumference thereof in the longitudinal direction of the rack guide 1 in total length, and are formed in the direction of circumference thereof four belt-form ribs 13 between each rib 12 being about the middle of the longitudinal direction so as to be connected with each rib 12. The respective ribs 12 and 13 are adapted to protrude by equal height from the outer periphery of the rack guide 1, respectively. The height is determined so that at room temperature, the space formed between those ribs and the inner periphery of the guide bore 5a is to be about the same as the minimum value of allowing the rack guide 1 to move longitudinally as well as radially, namely, the space formed between the rack guide made of sintered alloy and the guide bore.

In the apparatus having the rack guide 1 as aforementioned in accordance with the present invention, when the apparatus is at rest, the press surface 11 of the rack guide 1 abut the periphery of the rack shaft 3 with predetermined pressure. When the pinion shaft 4 is rotated in agreement with rotation of the steering wheel, the rack shaft 3 moves longitudinally. At this time, there is a case where the rack shaft 3 receives reaction force from the pinion shaft 4 caused by changing of the engaging position with the pinion shaft 4, however, the force is eliminated by pressure of the rack guide 1 and their stable engagement can be maintained.

At this time at the rack guide 1, since at room temperature, the inner periphery of guide bore 5a is separated from each rib 12 by the minimum space necessary for moving, stable pressure is exerted in the longitudinal direction. When reaction force of the rack shaft 3 is produced in the radial direction of the rack guide 1, and in particular, when reaction force is produced in the direction of between neighboring ribs 12 by engagement of helical gears, since ribs 13 including portions of the ribs 12, which are annularly disposed, are separated by the minimum space from the inner periphery of the guide bore 5a, the rack guide is not liable to move in the radial direction thereof and press the rack shaft 3 in the perpendicular direction approximately thereto.

At high temperature atmosphere, the rack guide 1 made of synthetic resin thermally expands. However, after the respective ribs 12 and 13 abut the inner surface of the guide bore 5a because of their thermal expansion, if the outer periphery of the rack guide 1 positioned in the front and rear sides of the longitudinal direction of each rib 13 and positioned between each rib 12, or, the peripheries of ribs 12 and 13, are set to be datums, the recessed portions begin thermally expanding. The depths, or, the protruded heights of the ribs 12 and 13 are set in advance so that the recessed portions are not tightly fitted into the inner surface of the guide bore 5a when they thermally expand even at the maximum temperature while the apparatus is normally used. As a result, when the rack guide 1 thermally expands, only the respective ribs 12 and 13 are fitted into the inner surface of the guide bore, thereby, the pressure and the direction property are not greatly reduced or not liable to be unstable in comparison with those at room temperature, ensuring the required functions.

A rack and pinion type steering apparatus of the present invention as aforementioned is provided with ribs in the outer periphery of the rack guide made of synthetic resin and set the space formed between the ribs and the inner periphery of the guide bore being generally the same as the space formed between the outer periphery of the rack guide made of sintered alloy and the inner periphery of the guide bore. At room temperature, the respective ribs enable press performance which is substantially the same as that of the rack guide made of sintered alloy, thus it is not liable to reduce the desirable reacting force at steering. At high temperature atmosphere, when the ribs thermally expand and abut the inner surface of the guide bore, the position excluding the ribs of the outer periphery thermally expands and the portion to be abutted is limited to the ribs, thereby, thermal creep is prevented from being produced, pressure is not liable to be troubled, and the direction property is maintained so as to have stable engagement with the pinion shaft. Thus, stable operation of steering is feasible at all times.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A rack and pinion type steering apparatus comprising, a rack shaft which is engaged with a pinion shaft being connected to a steering wheel;

a housing which houses said rack shaft, wherein a bore is formed at the side with no rack of said rack shaft in the perpendicular direction to said rack shaft; and a rack guide made of synthetic resin in a cylindrical shape, which is loosely fitted into said bore and is biased in order to press said rack shaft against said pinion shaft in its longitudinal direction;

said rack guide including in its outer periphery a plurality of axial ribs which are formed separately from each other by equal spaces in the direction of circumference thereof, and a plurality of peripheral ribs which are formed in the direction of circumference thereof with a predetermined width between each axial rib.

2. A rack and pinion type steering apparatus as set forth in claim 1, wherein said axial ribs are formed at the quartered position of circumference of the outer periphery of said rack guide with a proper width in the longitudinal direction of said rack guide in total length thereof.

3. A rack and pinion type steering apparatus as set forth in claim 2, wherein four said peripheral ribs are formed in a belt-form in the direction of circumference between said axial ribs positioned in substantially the middle of the longitudinal direction of said rack guide.

4. A rack and pinion type steering apparatus as set forth in claim 3, wherein the outer circumferences of said peripheral ribs and axial ribs are on the same circumference.

5. A rack guide made of synthetic resin in a cylindrical shape, which is loosely fitted into said bore and is biased to press the rack shaft against the pinion shaft in its longitudinal direction having, a plurality of axial ribs formed separately from each other by equal spaces in the direction of circumference;

a plurality of peripheral ribs formed between each axial rib in the direction of circumference thereof with a predetermined width.

6. A rack guide as set forth in claim 5, wherein said axial ribs are formed at the quartered position of circumference of the outer periphery of said rack guide with a proper width in the longitudinal direction of said rack guide in total length thereof.

7. A rack guide as set forth in claim 6, wherein four said peripheral ribs are formed in a belt-form in the direction of circumference between said axial ribs positioned in substantially the middle of the longitudinal direction of said rack guide.

8. A rack guide as set forth in claim 7, wherein the outer circumferences of said peripheral ribs and axial ribs are on the same circumference.

* * * * *